US012615233B2

(12) United States Patent
Waters

(10) Patent No.: US 12,615,233 B2
(45) Date of Patent: Apr. 28, 2026

(54) STORING AND ACCESSING OVERLAPPING INTERNET PROTOCOL (IP) ADDRESS RANGES

(71) Applicant: BMC Software, Inc., Houston, TX (US)

(72) Inventor: David Waters, Wesley Chapel, FL (US)

(73) Assignee: BMC Software, Inc., Houston, TX (US)

( * ) Notice: Subject to any disclaimer, the term of this patent is extended or adjusted under 35 U.S.C. 154(b) by 519 days.

(21) Appl. No.: 18/148,166

(22) Filed: Dec. 29, 2022

(65) Prior Publication Data

US 2024/0007436 A1 Jan. 4, 2024

Related U.S. Application Data

(60) Provisional application No. 63/367,442, filed on Jun. 30, 2022.

(51) Int. Cl.
H04L 29/06 (2006.01)
H04L 9/40 (2022.01)

(52) U.S. Cl.
CPC .......... H04L 63/0236 (2013.01); H04L 63/20 (2013.01)

(58) Field of Classification Search
CPC . H04L 63/0236; H04L 63/20; H04L 61/2535; H04L 61/2514; H04L 45/745; H04L 49/118; H04L 61/2503; H04L 61/5007; G05B 2219/15038; G05B 2219/25202; G06F 3/1231; H04W 88/026; G01V 15/00; G08B 13/2428; H01J 49/4295
See application file for complete search history.

(56) References Cited

U.S. PATENT DOCUMENTS

2010/0008374 A1* 1/2010 Shigeta ................... H04L 41/00
370/401

FOREIGN PATENT DOCUMENTS

CN 114978577 A * 8/2022

OTHER PUBLICATIONS

SRNT (Year: 2022).*

* cited by examiner

*Primary Examiner* — Joseph P Hirl
*Assistant Examiner* — Leynna Truvan
(74) *Attorney, Agent, or Firm* — Brake Hughes Bellermann LLP

(57) ABSTRACT

The described systems and techniques provide improved storage for overlapping IP address ranges and improved access to a given IP address's membership in the stored overlapping IP address ranges, in constant, O(1) access time with respect to the number of IP ranges stored or number of overlaps. The systems and technique include receiving an IP address, generating a positional score for the IP address, querying a positional data set containing a plurality of positional values using the positional score to find a first matching positional value, and querying a tag storage set containing a plurality of tag identifiers (IDs) using the first matching positional value to find a tag identifier (ID) from the plurality of tag IDs matching the first matching positional value, where the tag ID contains one or more tags with each of the one or more tags identifying a range of IP addresses containing the IP address.

18 Claims, 2 Drawing Sheets

200

STORING AND ACCESSING OVERLAPPING INTERNET PROTOCOL (IP) ADDRESS RANGES

CROSS REFERENCE TO RELATED APPLICATION

This application claims priority to U.S. Provisional Application No. 63/367,442, filed Jun. 30, 2022, entitled "STORING AND ACCESSING OVERLAPPING INTERNET PROTOCOL (IP) ADDRESS RANGES," which is hereby incorporated by reference in its entirety.

TECHNICAL FIELD

This description relates to storing and accessing overlapping internet protocol (IP) address ranges.

BACKGROUND

In cybersecurity, it is often necessary to identify whether an IP address appears on a list such as, for example, a threat list of known malicious IP addresses or groups of IP address ranges of known malicious IP addresses. The threat lists and groups of IP address ranges may be supplied by third party threat intelligence or may be created specifically for an organization. Many times, the threat lists and groups of IP address ranges include overlapping ranges of IP addresses. The data sources of the ranges of IP addresses can vary and the extent of the overlap may be unknown. Additionally, the data sources are constantly changing and growing.

In the cybersecurity context, and in other contexts, it is desirable to quickly search and determine whether an IP address is a member of one or more of these threat lists or groups of IP address ranges that have seemingly unlimited, overlapping IP address ranges. Conventional solutions such as, for example, manual searching or even interval trees, increase the complexity and time to search for and locate an IP address as the number of IP addresses in the data set grows and overlap of the IP addresses among the various lists exists. Improved technical solutions are needed to more efficiently and quickly search these threat lists and groups of IP address ranges to determine whether an IP address is a member of one of these threat lists or groups of IP address ranges so that an action may be taken to detect and/or counter potential malicious attacks on an organization's information technology (IT) systems.

SUMMARY

The described systems and techniques provide improved storage for overlapping IP address ranges and improved access to a given IP address's membership in the stored overlapping IP address ranges, in constant, $O(1)$ access time, with respect to the number of IP address ranges stored or number of overlaps. According to some general aspects, a computer program product may be tangibly embodied on a non-transitory computer-readable storage medium and may include instructions. When executed by at least one computing device, the instructions may cause the at least one computing device to receive an IP address, generate a positional score for the IP address, query a positional data set containing a plurality of positional values using the positional score to find a first matching positional value, and query a tag storage set containing a plurality of tag identifiers (IDs) using the first matching positional value to find a tag identifier (ID) from the plurality of tag IDs matching the first matching positional value, where the tag ID contains one or more tags with each of the one or more tags identifying a range of IP addresses containing the IP address.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
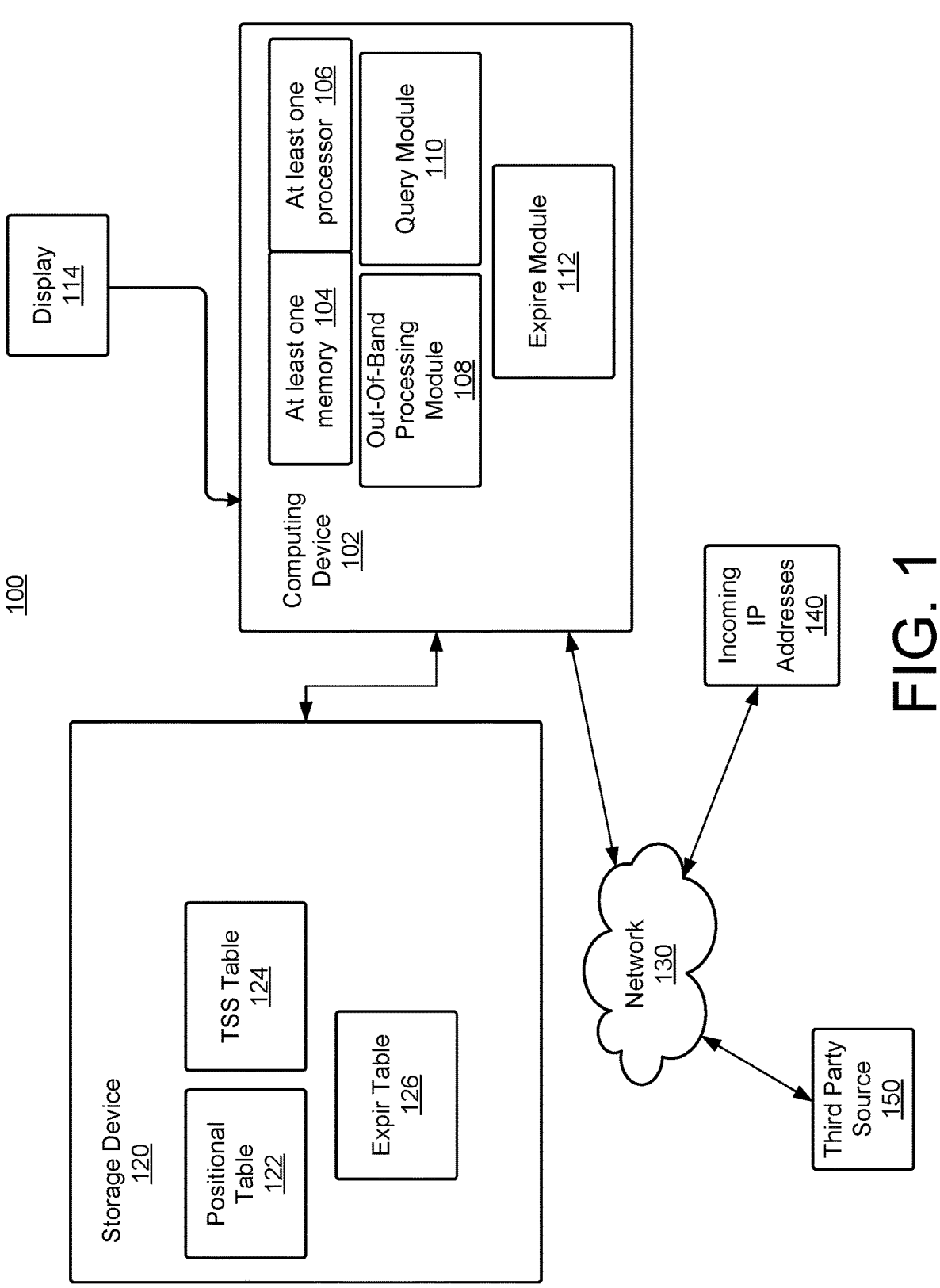
FIG. 1 is a block diagram of a system for storing and accessing overlapping IP address ranges.

The described systems and techniques provide improved storage for overlapping IP address ranges and improved access to a given IP address's membership in the stored overlapping IP address ranges, in constant, $O(1)$ access time, with respect to the number of IP address ranges stored or number of overlaps. In this manner, the response time for a query of an IP address against the stored IP address ranges is the same irrespective of the number of overlapping groups. That is, the response time for the query is the same for one group as it is for thousands of groups.

For example, a single IP address may be provided to query against the data set of stored overlapping IP address ranges. The data set is queried, and a response is provided with a list of tags, each representing an IP address, and that in their entirety represent groups of IP address ranges of which the provided IP address is a member. The response time from this process does not vary and is constant regardless of the number of IP address ranges of which the provided IP address is a member.

The described systems and techniques include multiple aspects that deliver the technical solution for being able to achieve a constant response time in relation to the number of IP address ranges of which the IP address is a member. One aspect of the technical solution is an out-of-band process for loading, managing, and cleaning the number of IP addresses in the data set. Another aspect of the technical solution is the query process for querying a received IP address against the data set of stored overlapping IP address ranges.

As used herein, the start IP address refers to the first IP address in a range of IP addresses.

As used herein, the finish IP address refers to the last IP address in a range of IP addresses.

As used herein, a tag ID refers to a unique, single word identifier in a range of IP addresses.

As used herein, a tag refers to a single word string that includes a combination of the tag ID, the start IP address, and the finish IP address, where the start IP address and the finish IP address may be separated by a defined value such as, for example, a double colon "::". Other defined values may be used as a separator.

As used herein, the start score refers to the start IP address after converting it into a positional value.

As used herein, the finish score refers to the finish IP address after converting it into a positional value.

As used herein, the positional values refer to positionals that contain two types of values: "start/carry forward" values and "finish" values. The start/carry forward value represents the start of an IP address range, ends with a designated identifier (e.g., a "2"), and/or represents a "carry forward" positional from a range that is a superset of the range. The finish values represent the end of an IP address range and ends with a designated identifier (e.g., a "1"). The positional values are conversions of an IP address into an integer.

As used herein, a positional sorted set (positional or positional table) refers to a single sorted set of the positional values (or scores or positional scores), that has each member and score having the same value. The score is the member, and this references the existence of a matching tag storage set, by that score, which contains the tag.

As used herein, a tag storage set (TSS or TSS table) refers to a data set for each score space, with each tag added as a member. The score space is the range of IP addresses represented by the start score and the finish score.

As used herein, the expired data set ("expir" or "expir table") refers to a single sorted set that tracks expiring IP address ranges to be removed from the positional sorted set and the TSS. The set key is the Epoch time representation of the expiration time and the tag value, where Epoch time in a computing context is the date and time relative to which a computer's clock and timestamp values are determined.

As used herein, a reverse range query is a query that searches for a specific range of values and returns the next equal or lesser value. For example, the reverse range query may be performed against the positional table.

FIG. 1 is a block diagram of a system 100 for storing and accessing overlapping IP address ranges. The system 100 includes a computing device 102, a storage device 120, and a network 130. The computing device 102 includes at least one memory 104, at least one processor 106, an out-of-band processing module 108, a query module 110, and an expire module 112. The computing device also may include a display 114. The computing device 102 may be implemented as a server (e.g., an application server), a desktop computer, a laptop computer, a mobile device such as a tablet device or mobile phone device, a mainframe, as well as other types of computing devices.

Although a single computing device 102 is illustrated, the computing device 102 may be representative of multiple computing devices in communication with one another, such as multiple servers in communication with one another being utilized to perform various functions over a network. In some implementations, the computing device 102 may be representative of multiple virtual machines in communication with one another in a virtual server environment, including those in a cloud environment or on a mainframe. In some implementations, the computing device 102 may be representative of one or more mainframe computing devices.

The at least one processor 106 may represent two or more processors on the computing device 102 executing in parallel and utilizing corresponding instructions stored using the at least one memory 104. The at least one processor 106 may include at least one graphics processing unit (GPU) and/or central processing unit (CPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the out-of-band processing module 108, the query module 110, and the expire module 112, the at least one memory 104 may be used to store data, such as rules, views, user interfaces (UI), and information used by and/or generated by these components.

The storage device 120 may include any type of storage device capable of storing a positional table 122, a TSS table 124, and an expired (expir) table 126 including, but not limited to, a disk-based storage device and a memory-based storage device. In some implementations, the storage device 120 is implemented as part of the computing device 102. In some implementations, the storage device 120 is implemented on a computing device that is separate from the computing device 102 but that is in communication with and/or communicably connected to the computing device 102 such that the computing device 102 may store and access information on the tables in the storage device 120.

The network 130 may be implemented as the Internet but may assume other different configurations. For example, the network 130 may include a wide area network (WAN), a local area network (LAN), a wireless network, an intranet, combinations of these networks, and other networks. Of course, although the network 130 is illustrated as a single network, the network 130 may be implemented as including multiple different networks.

The computing device 102 may communicate with one or more other computing devices over the network 130. In some implementations, the computing device 102 may function as a gateway computing device, such as a firewall device, through which one or more other computing devices (not shown) connect to the network 130 and/or to other devices connected to the network 130. For instance, the computing device 102 may receive communications over the network 130 from other remote computing devices represented by incoming IP addresses 140.

The out-of-band processing module 108 is configured to execute the out-of-band process. The out-of-band process is a separate process that manages the data sets that are used for the query. Each IP address range is processed into positional values. Those positional values (or scores) are inserted into one or more tables including the positional table 122, a TSS table 124, and the expir table 126, as discussed in more detail below. The expir table 126 is queried for expiring IP address ranges to be removed from the positional table 122 data set and the TSS table 124 data set.

The out-of-band process of out-of-band processing module 108 adds an IP address range to an existing positional data set in the positional table 122. In general, an IP address range is received, where the IP address range has a start IP address and a finish IP address. In some implementations, the IP address range is received from a third party source 150. The start IP address and the finish IP address are each converted into a positional score. First, the IP address is converted to an integer. Next, the integer is multiplied by a scalar, e.g., multiplied by 10. Finally, a constant is added to the value based on the IP address type. For instance, if the address is a start IP address, a "2" is added to the result. If the address is a finish IP address, a "1" is added to the result. The resulting integer values are now considered to be the start score and the finish score for the IP address range. The start score and the finish score are incorporated into and stored in the positional table 122 for the received IP address range. The positional table 122 is a sorted set of positional values.

For example, the out-of-band processing module 108 starts with the start score and scans backwards in the positional table 122 for the next available positional value. The out-of-band processing module 108 continues to add positional values at each overlap with other IP ranges until the finish score is reached. This is accomplished by scanning from a cursor position inside a loop. The tag is carried forward along with any other tags found along the way, if any, to be carried forward and inserted in the positional table 122.

The query module 110 functions as a query engine and is configured to execute the query process. In the query process, the positional table 122 is queried to identify all ranges of which an IP address is a member. The positional table 122 generates a response with only the next matching positional value based on a reverse range query of the score. If the score ends with a designated identifier such as, for example, a "2", a start/carry forward score, then the TSS table 124 matching that score will be carried forward as a query for all members. The response is a list of each tag identifier of which the queried IP address is a member.

In this manner, in one example use case, an incoming IP address 140 that is received at a network component, such as the computing device 102 functioning as a server or router or the like, can be input into the query module 110 and searched against the positional table 122, which contains all the ranges of potentially malicious IP addresses, to determine if the received IP address is a member of a malicious IP address ranges group. A match against the positional table 122 is used to identify each tag identifier in the TSS table 124. If the IP address is identified as a match as a member of one or more malicious IP address range groups, then action may be taken to prevent and/or counter malicious actions from occurring against the computing device 102 and other computing devices connected to the network 130.

While other solutions to the technical problems presented herein may store similar information, the other solutions may have limitations in regard to either the number of IP address ranges stored, limitations in the ability to overlap, and/or performance degradation as the count of IP address ranges or count of overlapping IP address ranges increases over time. The described technical solutions solve the technical problems encountered with other solutions by providing systems and techniques for both the storage and the query of the IP address ranges to achieve technical effects of a consistent, efficient, fast response, with no degradation in response time capability, regardless of the number of overlapping IP address ranges. One technical effect achieved is that the response time is constant with two IP address ranges overlapping or as many as every stored IP address ranges that are overlapping.

The expire module 112 is configured to manage the expir table 126. The expire table 126 holds tags, along with the time (in Epoch time) in which the IP address range expires. In one example implementation, the expire module 112 may run a job periodically to find all expired events that should be removed from the expir table 126, the TSS table 124, and the positional table 122. For example, the expire module 112 may run a job every 10 seconds to find all expired events that need to be removed from the expir table 126. In some implementations, time periods other than every 10 seconds may be used such as, for example, every second, every five seconds, every minute, and the like.

The expire module 112 may query the expir table 126 with the following pseudocode:

```
. . .
clean_time=Time.now.utc
```

```
clean_time=clean_time.to_i.to_s
clean_array=$red12.zrangebyscore("exjson", "0", clean-
    _time.to_s)
. . .
```

The clean_array is an array that holds "items": all tags from "0" time through the present time. Each "item" is a group of values that uniquely identify the range. The expire module 112 passes this through the "Remove from Sets" process outlined next.

The following process performed by the expire module 112 using the following pseudocode removes tags from the TSS table 124, positional scores from the positional table 122, and concludes with removing the expiration data from the expir table 126.

```
# split the item into the values needed: range_tag, start_ip,
    finish_ip,
    and the complete item as expire_key
    item_array=item.split("::")
    range_tag=item_array[0]
    start_ip=item_array[1]
    finish_ip=item_array[2]
    expire_key=item.to_s
# Convert start and finish IP to start and finish score
    score_start=set_start_scores(start_ip)
    score_finish=set_finish_scores(finish_ip)
    score_start=validate_ip(score_start,score_finish)
# Loop from start to finish score until cleanup is done
    cleanupDone=false
    position=score_start
    while !cleanupDone.
```

Figure 2:
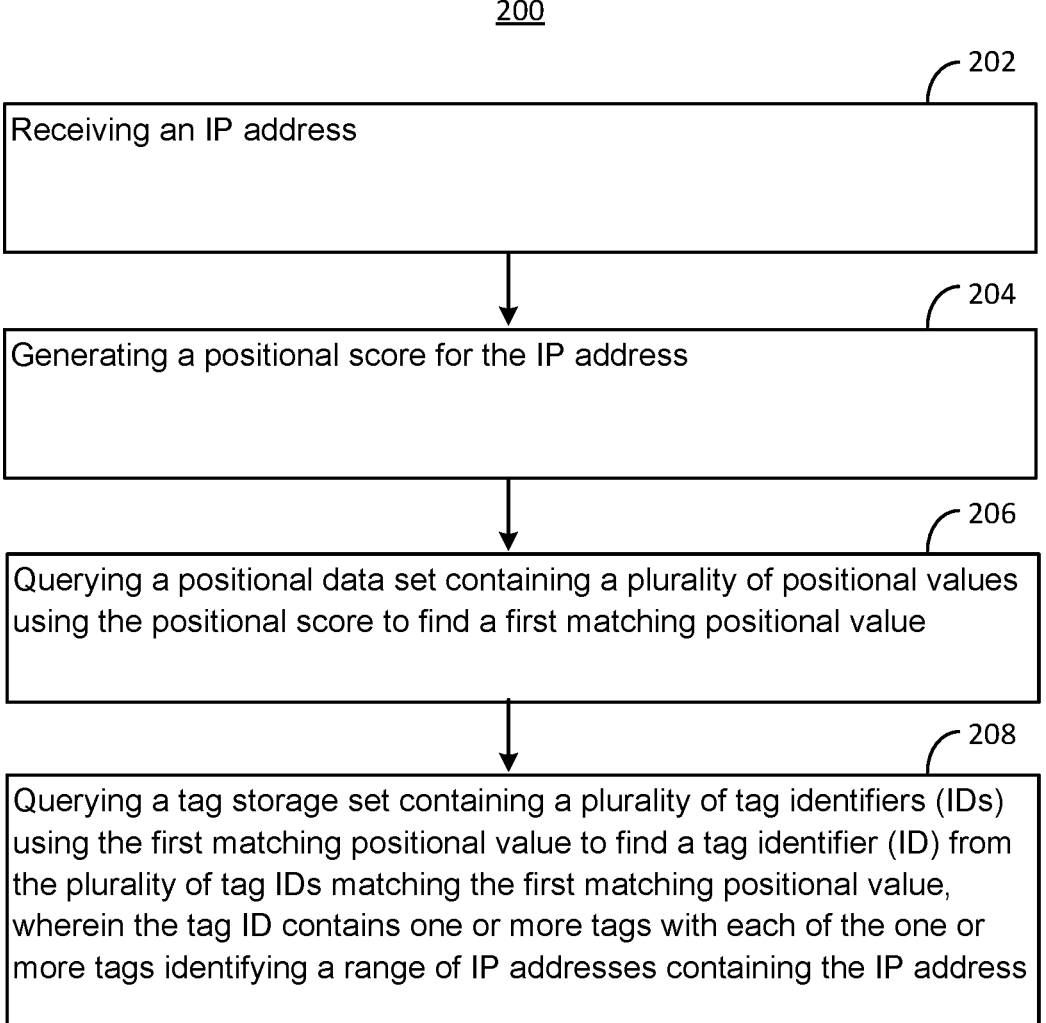
FIG. 2 is a flowchart illustrating example operations of the system of FIG. 1.

FIG. 2 is an example process 200 illustrating example operations of the system 100 of FIG. 1. Process 200 is an example process to query for an incoming IP address against the positional table 122 and the TSS table 124. Process 200 is a computer-implemented method that may be implemented by the computing device 102 and its components, including the query module 110. Instructions and/or executable code for the performance of process 200 may be stored in the at least one memory 104, and the stored instructions may be executed by the at least one processor 106. Process 200 is also illustrative of a computer program product that may be implemented by the computing device 102 and its components, including the query module 110.

Process 200 includes receiving an IP address (202). For example, the computing device 102 and the query module 110 receives an IP address. In some implementations, the IP address may be received across the network 130 as part of the incoming IP addresses 140 from remote devices attempting to access the computing device 102 or other computing devices connected to the computing device 102.

Process 200 includes generating a positional score for the IP address (204). For example, the query module 110 generates a positional score for the received IP address.

Process 200 includes querying a positional data set containing positional values using the positional score to find a first matching positional value (206). For example, the query module 110 queries the positional table 122 containing the positional values added during the out-of-band process by the out-of-band processing module 108. The query module 110 uses the positional score to find a first matching positional value. In some implementations, the query module 110 performs a reverse range query using the positional score to find the first matching positional value.

Process 200 includes querying a tag storage set containing a plurality of tag identifiers (IDs) using the first matching positional value to find a tag identifier (ID) from the plurality of tag IDs matching the first matching positional value, where the tag ID contains one or more tags with each of the one or more tags identifying a range of IP addresses containing the IP address (208). For example, the query module 110 uses the first matching positional value to query the TSS table 124 to find a tag ID matching the first matching positional value. In this manner, it is determined if the received IP address is contained in the tag ID.

In some implementation, an action may be performed in response to the IP address contained in one or more tags identifying the range of IP addresses. For instance, the action may include blocking the IP address from accessing one or more components of the network 130 or computing device 102.

In this manner, process 200 can find, for a single received IP address, all group memberships across the stored IP address ranges. In more specific detail, the IP address is converted into a start score. The positional table 122 is queried for the next value less than the start score. If the result is a start/carry forward score (it ends with a "2"), then the TSS table 124 is queried for all members of that key (the resulting score). The result is a list of all range tags of which the IP address is a member.

A detailed example is used as an illustration. First, the out-of-band processing module 108 adds two overlapping IP address ranges to the positional table 122, the TSS table 124, and the expir table 126.

tag_a: 10.10.10.10-10.10.10.100
tag_b: 10.10.10.20-10.10.10.80

First, the tags are converted to positional values or integers:

tag_a 168430090-168430180
tag_b 168430100-168430160

Then, a start score and a finish score are calculated for the positional values. A start score is calculated by: (start ip integer)*10+2:

tag_a start score 1684300902
tag_b start score 1684301002

A finish score is calculated by: (finish ip integer)*10+1 tag_a finish score 1684301801
tag_b finish score 1684301601

These are the resulting sets after each of these IP ranges is added to the positional table 122 and the TSS table 124 using the methods described here:

| Positional Table 122 (Example entries) | |
| --- | --- |
| member | score |
| 1684300902 | 1684300902 |
| 1684301002 | 1684301002 |
| 1684301601 | 1684301601 |
| 1684301602 | 1684301602 |
| 1684301801 | 1684301801 |

| TSS Table 124 (Example entries) | |
| --- | --- |
| key | members |
| 1684300902 | tag_a::10.10.10.10::10.10.10.100 |
| 1684301002 | tag_a::10.10.10.10::10.10.10.100 |
| | tag_b::10.10.10.20::10.10.10.80 |
| 1684301601 | tag_b::10.10.10.20::10.10.10.80 |
| 1684301602 | tag_a::10.10.10.10::10.10.10.100 |
| 1684301801 | tag_a::10.10.10.10::10.10.10.100 |

| Expir Table 126 (Example entries) | |
| --- | --- |
| key | members |
| tag_a::10.10.10.10::10.10.10.100 | 1646770198 |
| tag_b::10.10.10.20::10.10.10.80 | 1646770198 |

Once these ranges are added to the tables in the storage device 120, incoming IP addresses 140 may be queried against these tables. For example, with IP address of 10.10.10.60, the query module 110 can find its membership:

1. Convert to a start score—1684301402
2. Query the positional table 122 as outlined in "Query from the positional", a Reverse Range by Score Query with a limit of 1. The result is 1684301002.
3. Query the TSS table 124 for the set with the key equal to the resulting score. The result is an array with two tags:

[tag_a::10.10.10.10::10.10.10.100,tag_b::10.10.10.20:: 10.10.10.80].

In the above example, a single IP address may be provided to query against the data set of stored overlapping IP address ranges. The data set is queried, and a response is provided with a list of tags, which represent groups of IP address ranges of which the provided IP address is a member. The described systems and techniques are able to achieve a constant response time in relation to the number of IP address ranges of which the IP address is a member. While the example illustrated is for a single IP address, thousands or even millions of IP addresses may be received and efficiently and quickly queried to find the IP address ranges of which the IP addresses are members. If the IP address matches one of the IP address ranges that may mean that the received IP address is malicious or a threat and action can be taken to eliminate or mitigate the threat from the malicious IP address, including blocking the malicious IP address from being able to gain access to components on the network 130 or to the computing device 102.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer-implemented method for querying an internet protocol (IP) address, the computer-implemented method comprising:

receiving an IP address;

generating a positional score for the IP address;

querying a positional data set containing a plurality of positional values using the positional score to find a first matching positional value;

querying a tag storage set containing a plurality of tag identifiers (IDs) using the first matching positional value to find a tag identifier (ID) from the plurality of tag IDs matching the first matching positional value, wherein the tag ID contains one or more tags with each of the one or more tags identifying a range of IP addresses containing the IP address;

receiving a new range of IP addresses;

converting the range of IP addresses into new positional values; and adding the new positional values to the positional data set.

2. The computer-implemented method as in claim 1, wherein querying the positional data set includes performing a reverse range query using the positional score to find the first matching positional value.

3. The computer-implemented method as in claim 1, further comprising performing an action in response to the IP address contained in the one or more tags identifying the range of IP addresses.

4. The computer-implemented method as in claim 3, wherein the action includes blocking the IP address from accessing one or more components of a network.

5. The computer-implemented method as in claim 1, further comprising adding the new positional values to the tag storage set.

6. The computer-implemented method as in claim 1, further comprising adding the new positional values to an expired table, wherein the expired table includes a time that the new range of IP addresses expires.

7. A computer program product for querying an internet protocol (IP) address, the computer program product being tangibly embodied on a non-transitory computer-readable medium and including executable code that, when executed, causes at least one computing device to:

receive an IP address;

generate a positional score for the IP address;

query a positional data set containing a plurality of positional values using the positional score to find a first matching positional value;

query a tag storage set containing a plurality of tag identifiers (IDs) using the first matching positional value to find a tag identifier (ID) from the plurality of tag IDs matching the first matching positional value, wherein the tag ID contains one or more tags with each of the one or more tags identifying a range of IP addresses containing the IP address;

receive a new range of IP addresses;

convert the range of IP addresses into new positional values; and add the new positional values to the positional data set.

8. The computer program product of claim 7, wherein the executable code that, when executed, causes the at least one computing device to query the positional data set by performing a reverse range query using the positional score to find the first matching positional value.

9. The computer program product of claim 7, further comprising executable code that, when executed, causes the at least one computing device to perform an action in response to the IP address contained in the one or more tags identifying the range of IP addresses.

10. The computer program product of claim 9, wherein the action includes blocking the IP address from accessing one or more components of a network.

11. The computer program product of claim 7, further comprising executable code that, when executed, causes the at least one computing device to add the new positional values to the tag storage set.

12. The computer program product of claim 7, further comprising executable code that, when executed, causes the at least one computing device to add the new positional values to an expired table, wherein the expired table includes a time that the new range of IP addresses expires.

13. A system for querying an internet protocol (IP) address, the system comprising:

at least one processor; and a memory storing instructions that, when executed by the at least one processor, cause the at least one processor to:

receive an IP address;

generate a positional score for the IP address;

query a positional data set containing a plurality of positional values using the positional score to find a first matching positional value;

query a tag storage set containing a plurality of tag identifiers (IDs) using the first matching positional value to find a tag identifier (ID) from the plurality of tag IDs matching the first matching positional value, wherein the tag ID contains one or more tags with each of the one or more tags identifying a range of IP addresses containing the IP address;

receive a new range of IP addresses;

convert the range of IP addresses into new positional values; and add the new positional values to the positional data set.

14. The system of claim 13, wherein the instructions that, when executed, cause the at least one processor to query the positional data set by performing a reverse range query using the positional score to find the first matching positional value.

15. The system of claim 13, further comprising instructions that, when executed, cause the at least one processor to perform an action in response to the IP address contained in the one or more tags identifying the range of IP addresses.

16. The system of claim 15, wherein the action includes blocking the IP address from accessing one or more components of a network.

17. The system of claim 13, further comprising instructions that, when executed, cause the at least one processor to add the new positional values to the tag storage set.

18. The system of claim 13, further comprising instructions that, when executed, causes the at least one processor to add the new positional values to an expired table, wherein the expired table includes a time that the new range of IP addresses expires.

* * * * *